United States Patent
Chae et al.

(10) Patent No.: US 7,586,981 B2
(45) Date of Patent: Sep. 8, 2009

(54) APPARATUS AND METHOD FOR RECEIVING DATA IN A MOBILE COMMUNICATION SYSTEM USING AN ADAPTIVE ANTENNA ARRAY SCHEME

(75) Inventors: Chan-Byoung Chae, Seoul (KR); Chang-Ho Suh, Seoul (KR); Katz Marcos Daniel, Suwon-si (KR); Seok-Hyun Yoon, Seoul (KR); Byoung-Yun Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 783 days.

(21) Appl. No.: 10/893,439

(22) Filed: Jul. 16, 2004

(65) Prior Publication Data

US 2005/0013349 A1    Jan. 20, 2005

(30) Foreign Application Priority Data

Jul. 16, 2003   (KR) ................. 10-2003-0048898

(51) Int. Cl.
*H04B 1/00*   (2006.01)
(52) U.S. Cl. ..................... 375/148; 375/340; 375/346; 455/63.1; 455/65
(58) Field of Classification Search ......... 375/130–153, 375/267, 346–349, 229–233, 340; 455/506, 455/524, 63.1, 65, 561, 562.1
See application file for complete search history.

(56) References Cited

U.S. PATENT DOCUMENTS

| 6,177,906 B1 * | 1/2001 | Petrus ................. 342/378 |
| 2002/0054621 A1 | 5/2002 | Kyeong et al. |
| 2003/0128656 A1 | 7/2003 | Scarpa |
| 2003/0219085 A1 * | 11/2003 | Endres et al. .............. 375/350 |

FOREIGN PATENT DOCUMENTS

JP    10-303633    11/1998

OTHER PUBLICATIONS

Kwak, et al. "blind adaptive space-time receiving and transmitting diversities for multiuser DS-CDMA systems", 1999 IEEE, pp. 924-928.*

(Continued)

*Primary Examiner*—David C Payne
*Assistant Examiner*—Rahel Guarino
(74) *Attorney, Agent, or Firm*—The Farrell Law Firm, LLP

(57) ABSTRACT

A mobile communication system receives a reception signal, and determines a first error value by using a first scheme, and a second error value by using a second scheme, and determines a first scheme application weight according to a difference between the first error value and the second error value, and a second scheme application weight according to the difference between the first error value and the second error value, and generates a third error value using a scheme that combines the first scheme to which the first scheme application weight is applied and the second scheme to which the second scheme application weight is applied, and determines a reception beam weight using the reception signal, the third error value, and an output signal generated by applying the reception beam to the reception signal, wherein the reception beam weight is used for generating the reception beam.

12 Claims, 8 Drawing Sheets

OTHER PUBLICATIONS

Lu et al., "adaptive blind MIMO channel estimation and multiuser detection in DS-CDMA systems", 1999 IEEE, global telecommunication conference, pp. 2254-2258.*

Kwak et al., "Blind Adaptive Space-Time Receiving and Transmitting Diversities for Multiuser DS-CDMA Systems", 1999 IEEE, pp. 924-928.

Ohgane et al., "BER Performance of CMA Adaptive Array For High-Speed GMSK Mobile Communication—A Description of Measurements in Central Tokyo", IEEE Transactions on Vehicular Technology, 42 Nov. 1993, No. 4, pp. 484-490.

* cited by examiner

APPARATUS AND METHOD FOR RECEIVING DATA IN A MOBILE COMMUNICATION SYSTEM USING AN ADAPTIVE ANTENNA ARRAY SCHEME

PRIORITY

This application claims priority under 35 U.S.C. § 119 to an application entitled "Apparatus and Method for Receiving Data in a Mobile Communication System Using An Adaptive Antenna Array" filed in the Korean Intellectual Property Office on Jul. 16, 2003 and assigned Serial No. 2003-48898, the contents of which are incorporated herein by reference.

BACKGROUND OF THE INVENTION

1. Field of the Invention

The present invention relates generally to an apparatus and method for receiving data in a mobile communication system using an Adaptive Antenna Array (AAA) scheme, and in particular, to an apparatus and method for receiving data using an adaptive reception beam weight generation scheme.

2. Description of the Related Art

A "next generation mobile communication system" has evolved into a packet service communication system that transmits burst packet data to a plurality of mobile stations (MSs). The packet service communication system is designed to transmit mass data. Such a packet service communication system has been developing for high-speed packet service. In this regard, the $3^{rd}$ Generation Partnership Project (3GPP), a standardization organization for an asynchronous communication scheme, proposes a High Speed Downlink Packet Access (HSDPA) to provide the high-speed packet service, while the $3^{rd}$ Generation Partnership Project 2 (3GPP2), a standardization organization for a synchronous communication scheme, proposes a 1× Evolution Data Only/Voice (1× EV-DO/V) to provide the high-speed packet service. Both the HSDPA and the 1× EV-DO/V intend to provide high-speed packet service for smooth transmission of Web/Internet service, and in order to provide the high-speed packet service, a peak throughput and average throughput should be optimized for smooth transmission of the packet data as well as the circuit data, e.g., voice service data.

In order to support the high-speed transmission of packet data, a communication system employing the HSDPA (hereinafter referred to as an "HSDPA communication system") has newly introduced 3 kinds of data transmission schemes: an Adaptive Modulation and Coding (AMC) scheme; a Hybrid Automatic Retransmission Request (HARQ) scheme; and a Fast Cell Selection (FCS) scheme. The HSDPA communication system increases a data rate using the AMC, HARQ, and FCS schemes.

A communication system using the 1× EV-DO/V (hereinafter referred to as a "1× EV-DO/V communication system") is another communication system for increasing a data rate. The 1× EV-DO/V communication system also increases a data rate to secure system performance. Aside from the new schemes such as AMC, HARQ and FCS, there is a Multiple Antenna scheme, which is another scheme for coping with the limitation in assigned bandwidth, i.e., increasing a data rate. The Multiple Antenna scheme can overcome the limitation of bandwidth resource in a frequency domain because it utilizes a space domain.

A communication system is constructed such that a plurality of MSs communicate with each other via one base station (BS). When the BS performs a high-speed data transmission to the MSs, a fading phenomenon occurs due to a characteristic of radio channels. In order to overcome the fading phenomenon, a Transmit Antenna Diversity scheme, which is a kind of the Multiple Antenna scheme, has been proposed. The Transmit Antenna Diversity scheme transmits signals using at least two transmission antennas to minimize a loss of transmission data due to the fading phenomenon, thereby increasing a data rate.

Generally, in a wireless channel environment in a mobile communication system, unlike in a wired channel environment, a transmission signal is actually distorted due to several factors, such as multipath interference, shadowing, wave attenuation, time-varying noise, interference, etc. Fading caused by the multipath interference is closely related to the mobility of a reflector or a user (or aMS), and actually, a mixture of a transmission signal and an interference signal is received. Therefore, the received signal suffers from severe distortion during its actual transmission, thereby reducing performance of the entire mobile communication system. The fading may result in the distortion in the amplitude and the phase of the received signal, preventing high-speed data communication in the wireless channel environment. Many studies are being conducted in order to resolve the fading. Accordingly, in order to transmit data at a high speed, the mobile communication system must minimize a loss caused by a characteristic of a mobile communication channel, such as fading, and interference of an individual user. A diversity scheme is used to prevent unstable communication due to the fading, and multiple antennas are used to implement a Space Diversity scheme.

Transmit Antenna Diversity is popularly used as a scheme for efficiently resolving the fading phenomenon. The Transmit Antenna Diversity scheme receives a plurality of transmission signals that have experienced an independent fading phenomena in a wireless channel environment, thereby coping with distortion caused by the fading. The Transmit Antenna Diversity is classified into Time Diversity, Frequency Diversity, Multipath Diversity, and Space Diversity. In other words, a mobile communication system must cope well with the fading phenomenon that severely affects communication performance, in order to perform the high-speed data communication.

As indicated above, the fading phenomenon must be overcome because it reduces the amplitude of a received signal up to several dB to tens of dB. For example, a Code Division Multiple Access (CDMA) scheme utilizes a Rake receiver that can achieve diversity performance using a delay spread of the channel. The Rake receiver is a kind of a Receive Diversity scheme for receiving multipath signals. However, the Receive Diversity used in the Rake receiver is disadvantageous in that it cannot achieve a desired diversity gain when the delay spread of the channel is relatively small.

The Time Diversity scheme efficiently copes with burst errors occurring in a wireless channel environment using interleaving and coding, and is generally used in a Doppler spread channel. Disadvantageously, however, the Time Diversity does not work well in a low-speed Doppler spread channel.

The Space Diversity scheme is generally used in a channel with a low delay spread such as an indoor channel and a pedestrian channel, which is a low-speed Doppler spread channel. The Space Diversity scheme achieves a diversity gain using at least two antennas. In this scheme, when a signal transmitted via one antenna is attenuated due to fading, a signal transmitted via another antenna is received, thereby acquiring a diversity gain. The Space Diversity is classified into Receive Antenna Diversity using a plurality of reception antennas and Transmit Antenna Diversity using a plurality of transmission antennas.

In the Receive-Adaptive Antenna Array (Rx-AAA) scheme, by calculating a scalar product of an appropriate reception beam weight vector and a signal vector of a reception signal received via an antenna array comprised of a plurality of reception antennas, a signal received in a direction desired by a receiver is maximized and a signal received in a direction not desired by the receiver is minimized. Herein, the reception beam weight represents a weight for generating the reception beam generated by the receiver in applying the Rx-AAA scheme. As a result, the Rx-AAA scheme amplifies only a desired reception signal to a maximum level, thereby maintaining a high-quality call and increasing the entire system capacity and service coverage.

Although the Rx-AAA scheme can be applied to both a Frequency Division Multiple Access (FDMA) mobile communication system and a Time Division Multiple Access (TDMA) mobile communication system, it will be assumed herein that the Rx-AAA scheme is applied to a communication system using CDMA schemes (hereinafter referred to as a "CDMA communication system").

FIG. 1 is a block diagram illustrating a structure of a BS receiver in a conventional CDMA mobile communication system. Referring to FIG. 1, the BS receiver is comprised of N reception antennas (Rx_ANT) including a first reception antenna 111, a second reception antenna 121, . . . , and an $N^{th}$ reception antenna 131, N radio frequency (RF) processors including a first RF processor 112, a second RF processor 122, . . . , and an $N^{th}$ RF processor 132, being mapped to the corresponding reception antennas, N multipath searchers including a first multipath searcher 113, a second multipath searcher 123, . . . , and an $N^{th}$ multipath searcher 133, being coupled to the corresponding RF processors, L fingers including a first finger 140-1, a second finger 140-2, . . . , and an $L^{th}$ finger 140-L, for processing L multipath signals searched by the multipath searchers, a multipath combiner 150 for combining multipath signals output from the L fingers, a deinterleaver 160, and a decoder 170.

Signals transmitted by transmitters in a plurality of MSs are received at the N reception antennas over a multipath fading radio channel. The first reception antenna 111 outputs the received signal to the first RF processor 112. Each of the RF processors—includes an amplifier, a frequency converter, a filter, and an analog-to-digital (A/D) converter, and processes an RF signal. The first RF processor 112 RF-processes a signal output from the first reception antenna 111 to convert the signal into a baseband digital signal, and outputs the baseband digital signal to the first multipath searcher 113. The first multipath searcher 113 separates L multipath components from a signal output from the first RF processor 112. The separated L multipath components are output to the first finger 140-1 to the $L^{th}$ finger 140-L, respectively.

The first finger 140-1 to the $L^{th}$ finger 140-L, being mapped to the L multiple paths on a one-to-one basis, process the L multipath components. Because the L multiple paths are considered for each of the signals received via the N reception antennas, signal processing must be performed on N×L signals, and among the N×L signals, signals on the same path are output to the same finger.

Similarly, the second reception antenna 121 outputs the received signal to the second RF processor 122. The second RF processor 122 RF-processes a signal output from the second reception antenna 121 to convert the signal into a baseband digital signal, and outputs the baseband digital signal to the second multipath searcher 123. The second multipath searcher 123 separates L multipath components from a signal output from the second RF processor 122, and the separated L multipath components are output to the first finger 140-1 to the $L^{th}$ finger 140-L, respectively.

In this same manner, the $N^{th}$ reception antenna 131 outputs the received signal to the $N^{th}$ RF processor 132. The $N^{th}$ RF processor 132 RF-processes a signal output from the $N^{th}$ reception antenna 131 to convert the signal into a baseband digital signal, and outputs the baseband digital signal to the $N^{th}$ multipath searcher 133. The $N^{th}$ multipath searcher 133 separates L multipath components from a signal output from the $N^{th}$ RF processor 132, and the separated L multipath components are output to the first finger 140-1 to the $L^{th}$ finger 140-L, respectively.

Accordingly, among the L multipath signals for the signals received via the N reception antennas, the same multipath signals are input to the same fingers. For example, first multipath signals from the first reception antenna 111 to the $N^{th}$ reception antenna 131 are input to the first finger 140-1. In the same manner, $L^{th}$ multipath signals from the first reception antenna 111 to the $N^{th}$ reception antenna 131 are input to the $L^{th}$ finger 140-L. The first finger 140-1 to the $L^{th}$ finger 140-L are different only in signals input thereto and output therefrom, and are identical in structure and operation. Therefore, only the first finger 140-1 will be described for simplicity.

The first finger 140-1 has N despreaders including a first despreader 141, a second despreader 142, . . . , and an $N^{th}$ despreader 143, being mapped to the N multipath searchers, a signal processor 144 for calculating a weight vector for generating a reception beam using signals received from the N despreaders, and a reception beam generator 145 for generating a reception beam using the weight vector calculated by the signal processor 144.

A first multipath signal output from the first multipath searcher 113 is input to the first despreader 141. The first despreader 141 despreads the first multipath signal output from the first multipath searcher 113 with a predetermined despreading code, and outputs the despread multipath signal to the signal processor 144 and the reception beam generator 145. Here, the despreading process is called "temporal processing." Similarly, a first multipath signal output from the second multipath searcher 123 is input to the second despreader 142. The second despreader 142 despreads the first multipath signal output from the second multipath searcher 123 with a predetermined despreading code, and outputs the despread multipath signal to the signal processor 144 and the reception beam generator 145. Similarly, a first multipath signal output from the $N^{th}$ multipath searcher 133 is input to the $N^{th}$ despreader 143. The $N^{th}$ despreader 143 despreads the first multipath signal output from the $N^{th}$ multipath searcher 133 with a predetermined despreading code, and outputs the despread multipath signal to the signal processor 144 and the reception beam generator 145.

The signal processor 144 receives the signals output from the first despreader 141 to the $N^{th}$ despreader 143, and calculates a reception beam weight set $W_k$ for generating a reception beam. A set of first multipath signals output from the first multipath searcher 113 to the $N^{th}$ multipath searcher 133 will be defined as "$X_k$." The first multipath signal set $X_k$ represents a set of first multipath signals received via the first reception antenna 111 to the $N^{th}$ reception antenna 131 at a $k^{th}$ point, and the first multipath signals constituting the first multipath signal set $X_k$ are all vector signals. The reception beam weight set $W_k$ represents a set of reception beam weights to be applied to the first multipath signals received via the first reception antenna 111 to the $N^{th}$ reception antenna 131 at the $k^{th}$ point, and the reception beam weights constituting the weight set $W_k$ are all vector signals.

A set of signals determined by despreading all of the first multipath signals in the first multipath signal set $X_k$ will be defined as $y_k$. The despread signal set $y_k$ of the first multipath signals represents a set of signals determined by despreading the first multipath signals received via the first reception antenna 111 to the $N^{th}$ reception antenna 131 at the $k^{th}$ point, and the despread signals constituting despread signal set $y_k$ of the first multipath signals are all vector signals. Herein, for the convenience of explanation, the term "set" will be omitted, and the underlined parameters represent sets of corresponding elements.

Each of the first despreaders 141 to the $N^{th}$ despreaders 143 despreads the first multipath signal $X_k$ with a predetermined despreading code, such that the reception power of a desired reception signal is greater than the reception power of an interference signal by a process gain. The despreading code is identical to the spreading code used in the transmitters of the MSs.

As described above, the despread signal $y_k$ of the first multipath signal $X_k$ is input to the signal processor 144. The signal processor 144 calculates a reception beam weight $W_k$ with the despread signal $y_k$ of the first multipath signal $X_k$, and outputs the reception beam weight $W_k$ to the reception beam generator 145. As a result, the signal processor 144 calculates the reception beam weight $W_k$ including a total of N weight vectors applied to the first multipath signal $X_k$ output from the first reception antenna 111 to the $N^{th}$ reception antenna 131, with the despread signals $y_k$ of a total of N first multipath signals output from the first reception antenna 111 to the $N^{th}$ reception antenna 131. The reception beam generator 145 receives the despread signals $y_k$ of a total of the N first multipath signals $X_k$ and a total of the N reception beam weight vectors $W_k$. The reception beam generator 145 generates a reception beam with a total of the N reception beam weight vectors $W_k$, calculates a scalar product of the despread signal $y_k$ of the first multipath signal $X_k$ and the reception beam weight $W_k$ corresponding to the reception beam, and outputs the result as an output $z_k$ of the first finger 140-1. The output $z_k$ of the first finger 140-1 can be expressed as shown in Equation (1).

$$z_k = w_k^H y_k \quad (1)$$

In Equation (1), H denotes a Hermitian operator, i.e., a conjugate-transpose. A set $z_k$ of output signals $z_k$ from L fingers in the BS receiver is finally input to the multipath combiner 150.

Although only the first finger 140-1 has been described, the other fingers, the second finger 140-2 to the $L^{th}$ finger 140-L, are to the same as the first finger 140-1 in operation.

The multipath combiner 150 combines the signals output from the first finger 140-1 to the $L^{th}$ finger 140-L, and outputs the combined signal to the deinterleaver 160. The deinterleaver 160 deinterleaves the signal output from the multipath combiner 150 in a deinterleaving method corresponding to the interleaving method used in the transmitter, and outputs the deinterleaved signal to the decoder 170. The decoder 170 decodes the signal output from the deinterleaver 160 in a decoding method corresponding to the encoding method used in the transmitter, and outputs the decoded signal as final reception data.

The signal processor 144 calculates a reception beam weight $W_k$ such that a Mean Square Error (MSE) of a signal received from a MS transmitter, desired to be received by a predetermined algorithm, becomes minimized. The reception beam generator 145 generates a reception beam using the reception beam weight $W_k$ generated by the signal processor 144. The process of generating a reception beam such that the MSE is minimized is called "spatial processing." When the Rx-AAA scheme is used in a CDMA mobile communication system, temporal processing and spatial processing are simultaneously performed. The operation of simultaneously performing temporal processing and spatial processing is called "spatial-temporal processing."

The signal processor 144 receives multipath signals despread for each finger in the above-described manner, and calculates a reception beam weight capable of maximizing a gain of the Rx-AAA scheme according to a predetermined algorithm. The signal processor 144 minimizes the MSE.

Currently, a great deal of research is being conducted on a reception beam weight calculation algorithm for adaptively minimizing the MSE. However, the reception beam weight calculation algorithm for adaptively minimizing the MSE is an algorithm for reducing errors on the basis of a reference signal, and this algorithm supports a Constant Modulus (CM) scheme and a Decision-Directed (DD) scheme as a blind scheme, when there is no reference signal.

Further, the algorithm for reducing errors on the basis of a reference signal has trouble converging into a minimum MSE value desired by the system in an environment where a channel such as a fast fading channel suffers from a rapid change, or an environment where a high-order modulation scheme such as 16-ary quadrature amplitude modulation (16 QAM) is used. Even though it converges into a particular MSE value, the minimum MSE value is set to a relatively large value. When the minimum MSE value is set to a relatively large value, a gain that occurs from using the Rx-AAA scheme is reduced. Therefore, this algorithm is not suitable for a high-speed data communication system.

SUMMARY OF THE INVENTION

It is, therefore, an object of the present invention to provide an apparatus and a method for receiving data using an Adaptive Antenna Array scheme in a mobile communication system.

It is another object of the present invention to provide an apparatus and a method for receiving data using an adaptive reception beam weight generation scheme in a mobile communication system using an Adaptive Antenna Array scheme.

It is further another object of the present invention to provide an apparatus and a method for generating a reception beam having a minimum error value in a mobile communication system using an Adaptive Antenna Array scheme.

In accordance with a first aspect of the present invention, there is provided a method of generating a reception beam weight for generating a reception beam from a reception signal, the method includes, determining a first error value by using a first scheme at a timing point, and a second error value by using a second scheme different from the first scheme at the timing point, determining a first scheme application weight according to a difference between the first error value and the second error value, and a second scheme application weight according to the difference between the first error value and the second error value, generating a third error value using a scheme that combines the first scheme to which the first scheme application weight is applied—and the second scheme to which the second scheme application weight is applied, determining a reception beam weight using the reception signal, the third error value, and an output signal generated by applying the reception beam to the reception signal, wherein the reception beam weight is used for generating the reception beam.

In accordance with a second aspect of the present invention, there is provided an apparatus of generating a reception beam weight for generating a reception beam from a reception signal, the apparatus includes, an error value combiner determining a first error value by using a first scheme at a timing point, and a second error value by using a second scheme different from the first scheme at the timing point, determining a first scheme application weight according to a difference between the first error value and the second error value, and a second scheme application weight according to the difference between the first error value and the second error value; generating a third error value using a scheme that combines the first scheme to which the first scheme application weight is applied—and the second scheme to which the second scheme application weight is applied, a weight calculator for determining a reception beam weight using the reception signal, the third error value, and an output signal generated by applying the reception beam to the reception signal, wherein the reception beam weight is used for generating the reception beam.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Figure 1:
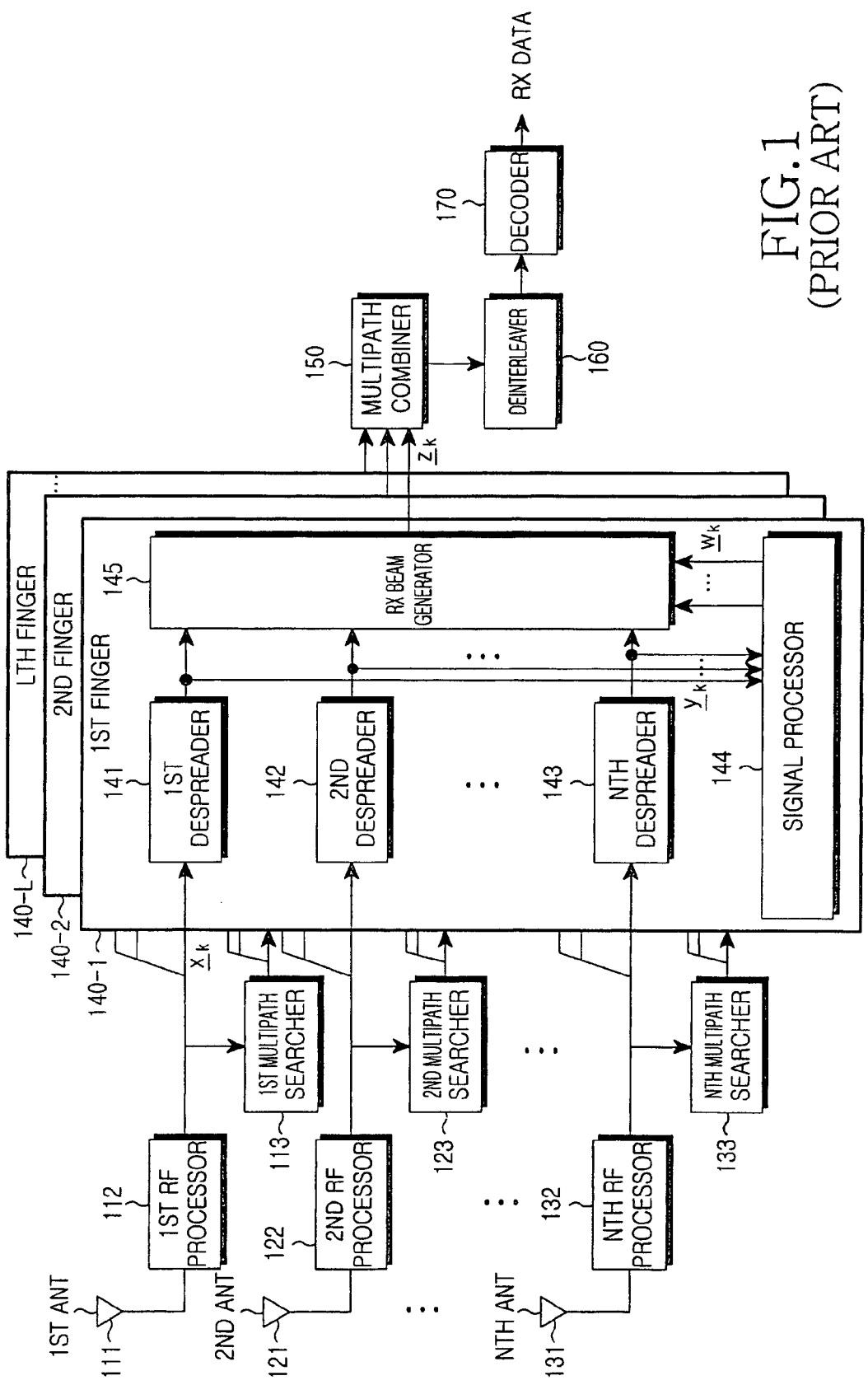
FIG. 1 is a block diagram illustrating a base station receiver in a conventional CDMA mobile communication system.

Several preferred embodiments of the present invention will now be described in detail herein below with reference to the annexed drawings. In the drawings, the same or similar elements are denoted by the same reference numerals even though they are depicted in different drawings. In the following description, a detailed description of known functions and configurations incorporated herein has been omitted for conciseness.

Before a description of the present invention is given, a model of a reception signal received at a receiver of a base station (BS) will be considered. It is assumed that a receiver of the BS includes a receive-antenna array having a plurality of reception antennas (Rx ANTs), and the receive-antenna array is generally mounted only in the receiver of the BS considering its cost and size, and is not mounted in a receiver of a mobile station (MS). That is, it is assumed that the receiver of the MS includes only one reception antenna.

Additionally, although the present invention is applicable to all of mobile communication systems using Frequency Division Multiple Access (FDMA), Time Division Multiple Access (TDMA), Code Division Multiple Access (CDMA), and Orthogonal Frequency Division Multiplexing (OFDM), the present invention will be described with reference to an OFDM mobile communication system.

A signal transmitted from a transmitter of an $m^{th}$ MS existing in a cell serviced by the BS is expressed as shown in Equation (2).

$$s_m(t) = \sqrt{p_m} b_m(t) c_m(t) \quad (2)$$

In Equation (2), $s_m(t)$ denotes a transmission signal of an $m^{th}$ MS, $p_m$ denotes transmission power of the $m^{th}$ MS, $b_m(t)$ denotes a user information bit sequence of the $m^{th}$ MS, and $c_m(t)$ denotes a user spreading code sequence of the $m^{th}$ MS, having a chip period of $T_c$.

The transmission signal transmitted from the MS transmitter is received at a receiver of the BS over a multipath vector channel. It is assumed that channel parameters of the multipath vector channel are relatively and continuously changed, compared with the bit period $T_b$. Therefore, it is assumed that the channel parameters of the multipath vector channel are constant for certain bit periods.

A complex base band reception signal for a first multipath of an $m^{th}$ MS, received at a receiver of the BS, is expressed by Equation (3). It should be noted that the reception signal of Equation (3) represents a base band signal determined by down-converting a radio frequency (RF) signal received at the BS receiver.

$$x_{ml}(t) = \alpha_{ml} e^{j\phi_{ml}} b_m(t-\tau_{ml}) c_m(t-\tau_{ml}) \underline{a}_{ml} \quad (3)$$

In Equation (3), $x_{ml(t)}$ denotes a set of complex base band reception signals received through a first multipath of the $m^{th}$ MS, $\alpha_{ml}$ denotes a fading attenuation applied to the first multipath of the $m^{th}$ MS, $\phi_{ml}$ denotes a phase transition applied to the first multipath of the $m^{th}$ MS, $\tau_{ml}$ denotes a time delay applied to the first multipath of the $m^{th}$ MS, and $a_{ml}$ denotes a set of array responses (ARs) applied to the first multipath of the $m^{th}$ MS. Because the BS receiver includes a plurality of antennas, for example, N reception antennas, a signal transmitted by the $m^{th}$ MS is received at the BS receiver via the N reception antennas. Therefore, the number of signals received via the first multipath is N, and N complex base band reception signals received via the first multipath of the $m^{th}$ MS constitute a set of the reception signals. Herein, for the convenience of explanation, the term "set" will be omitted, and the underlined parameters represent sets of corresponding elements.

When a current linear antenna array is used, the array response $a_{ml}$ is defined as shown in Equations (4).

$$\underline{a}_{ml} = \begin{bmatrix} 1 & e^{j2\pi\frac{d}{\lambda}\sin\theta_{ml}} & \cdots & e^{j2\pi\frac{d}{\lambda}(N-1)\sin\theta_{ml}} \end{bmatrix}^T \quad (4)$$

In Equation (4), 'd' denotes a distance between separated reception antennas, $\lambda$ denotes a wavelength at a frequency band in use, N denotes the number of the reception antennas, and $\theta_{ml}$ denotes direction-of-arrival (DOA) applied to the first multipath of the $m^{th}$ MS.

If it is assumed that the number of MSs existing in a cell serviced by the BS is M and there are L multiple paths for each of the M MSs, a reception signal received at the BS becomes the sum of transmission signals transmitted from the M MSs and additive white noise (AWN), as represented in Equation (5).

$$x(t) = \sum_{m=1}^{M} \sum_{l=1}^{L} x_{ml}(t) + n(t) \qquad (5)$$

In Equation (5), n(t) denotes the additive white noise added to the transmission signals transmitted from the M MSs.

It is assumed that a signal the BS desires to receive in the reception signal of Equation (5) is $x_{11}$. $x_{11}$ represents a signal a first MS has transmitted via a first multipath. Because it is assumed that a signal the BS desires to receive is $x_{11}$, all signals except the signal $x_{11}$ are regarded as interference signals and noise. Therefore, Equation (5) can be rewritten as shown in Equation (6).

$$x(t) = \alpha_{11} e^{j\phi_{11}} b_1(t-\tau_{11}) c_1(t-\tau_{11}) a_{11} + i(t) + n(t) \qquad (6)$$

In Equation (6), i(t) denotes an interference signal, which is defined in Equation (7), below.

$$i(t) = \sum_{l=2}^{L} x_{1l}(t) + \sum_{m=2}^{m} \sum_{l=1}^{L} x_{ml}(t) \qquad (7)$$

The first term $$\left( \sum_{l=2}^{L} x_{1l}(t) \right)$$

of Equation (7) is a transmission signal of a MS that the BS desires to receive, but represents the inter-path interference (IPI) by other multiple paths that the BS does not desire to receive. The second term $$\left( \sum_{m=2}^{M} \sum_{l=1}^{L} x_{ml}(t) \right)$$

of Equation (7) represents the multiple access interference (MAI) by other MSs.

Further, the x(t) is despread with a despreading code $c_1(t-\tau_{11})$ previously set in a first finger (l=1) for a corresponding multipath in a corresponding channel card of the BS receiver, i.e., a channel card (m=1) assigned to the first MS, and the despread signal y(t) is defined in Equation (8) below. The despreading code $c_1(t-\tau_{11})$ is identical to the despreading code $c_1(t-\tau_{11})$ used in a BS transmitter during signal transmission. The BS includes a plurality of receivers as described in conjunction with FIG. 1. Each of the receivers is called a "channel card," and one channel card is assigned to one MS. As described in connection with FIG. 1, the channel card includes as many fingers as the number of multiple paths, and the fingers are mapped to corresponding multipath signals on a one-to-one basis.

$$y(k) = \int_{(k-1)T_b+\tau_{11}}^{kT_b+\tau_{11}} x(t) c_1^*(t-\tau_{11}) dt \qquad (8)$$

In Equation (8), 'k' denotes a $k^{th}$ sampling point.

When the signal y(t) is generated by despreading the pre-despread signal x(t) with the despreading code $c_1(t-\tau_{11})$, the power of a signal component the BS receiver desires to receive from among the reception signals is amplified by a gain G according to a characteristic of a despreader. It is noted that although the power of a signal component the BS receiver desires to receive is amplified by a process gain G, the power of the signal components the BS receiver does not desire to receive is not changed at all. Therefore, a correlation matrix between a reception signal before despreading and a reception signal after despreading can be calculated.

In order to calculate the correlation matrix between a reception signal before despreading and a reception signal after despreading, the reception signal x(t) before despreading is sampled at a $k^{th}$ point, which is equal to the sampling point of the reception signal y(t) after despreading. The signal obtained by sampling the reception signal x(t) before despreading at the $k^{th}$ point is represented by Equation (9).

$$x(k) = \alpha_{11} e^{j\phi_{11}} b_{1k} c_{1k} a_{11} + i_k + n_k \qquad (9)$$

In conclusion, in order to calculate a correlation matrix between a reception signal x(t) before despreading and a reception signal y(t) after despreading, it is assumed that the signal of Equation (9) is acquired by sampling the reception signal x(t) before despreading at the $k^{th}$ point, which is equal to the sampling point of the reception signal y(t) after despreading, and that the reception signal x(t) before despreading and the reception signal y(t) after despreading are stationary.

A description will now be made of a Least Mean Square (LMS) scheme and a Minimum Mean Square Error (MMSE) scheme herein below.

In the LMS scheme, a set of reception signals before despreading, including complex reception signals received via N reception antennas at a particular time, i.e., complex reception signals $x_1$ to $x_N$ received via a first reception antenna to an $N^{th}$ reception antenna, will be defined as $x=[x_1, x_2, \ldots, x_N]^T$. Here, 'T' is an operator representing a transpose operation. In addition, a set of reception signals after despreading the complex reception signals $x_1, x_2, \ldots, x_N$ received via the N reception antennas will be defined as $y=[y_1, y_2, \ldots, y_N]^T$. The reception signal y after despreading is determined by the sum of a signal component s the BS receiver desires to receive and a signal component u the BS receiver does not desire to receive, as represented by Equation (10).

$$y = s + u \qquad (10)$$

A set of complex reception beam weight values to be multiplied by the complex reception signals $x_1, x_2, \ldots, x_N$ received via the N reception antennas, i.e., complex reception beam weights $w_1$ to $w_N$ to be multiplied by complex reception signals $x_1$ to $x_N$ received via the first reception antenna to the $N^{th}$ reception antenna, will be defined as $w=[w_1, w_2, \ldots, w_N]^T$.

An output signal z from fingers in a particular user card, i.e., a channel card assigned to a particular MS, is determined by calculating a scalar product of the reception beam weight w and the reception signal y after despreading, as represented by Equation (11).

$$z = \underline{w}^H \underline{y} = \sum_{i=1}^{N} w_i^* y_i \quad (11)$$

In Equation (11), 'i' denotes the number of reception antennas.

The output signal z can be classified into a signal component $w^H s$ the BS receiver desires to receive, and a signal component $w^H u$ the BS receiver does not desire to receive, using Equation (10) and Equation (11). The LMS scheme minimizes errors of a known reference signal and a reception signal, and particularly, minimizes a cost function J(w), as given below in equation (12).

$$J(w) = (e_k)^2$$

$$e_k = d_k - z_k \quad (12)$$

In Equation (12), 'J' denotes a cost function, and a reception beam weight value w for minimizing the cost function value J must be determined. Further, in Equation (12), $e_k$ denotes a difference, or an error, between a reception signal and a desired reception signal, and $d_k$ denotes the desired signal. In a reception beam algorithm using a non-blind scheme, a pilot signal is used as the desired signal $d_k$ by way of example. However, the present invention proposes a reception beam algorithm using a blind scheme, such that a detailed description of the reception beam algorithm using the non-blind scheme will be omitted.

In Equation (12), the cost function J is a type of a second-order convex function. Therefore, in order to minimize the cost function J, the cost function J must be differentiated until its value becomes 0. A differentiated value of the cost function J is shown below in Equation (13).

$$\nabla J = -2e_k^* y_k \quad (13)$$

However, it is difficult to acquire an optimal reception beam weight $w^{opt}$ in an actual channel environment in a single process, and because the reception signal y after despreading is input at each point, a recursive formula of Equation (14) should be used in order to adaptively or recursively acquire the optimal reception beam weight $w^{opt}$.

$$w_{k+1} = w_k + \mu v_k \quad (14)$$

In Equation (14), 'k' denotes a $k^{th}$ point, $w_k$ denotes a reception beam weight at the $k^{th}$ point, μ denotes a constant gain, and $v_k$ denotes a trace vector at the $k^{th}$ point. The trace vector $v_k$ at the $k^{th}$ point represents a vector for converging a differentiated value of the cost function J to a minimum value, for example, 0. That is, Equation (14) shows a process of updating a value generated before or after a constant gain μ from a given reception beam weight $w^k$ to be used at a current point in a direction of the trace vector $v_k$ as a reception beam weight $w_{k+1}$ to be used at the next point.

The scheme for detecting a desired reception signal d(k), proposed in the present invention, is called a "blind scheme." Due to the use of the blind scheme, a received signal should be adaptively converged using a particular estimation value, and a below scheme is used for the adaptive convergence of the received signal.

A combination mode blind scheme is used for detecting a desired received signal d(k). In this case, an error function is expressed as shown in Equation (15).

$$e_k = \alpha_k \cdot e_k^{CM} + \beta_k \cdot e_k^{DD} \quad (15)$$

$$\alpha_k = g(|e_k^{DD}|),$$

$$\beta_k = (1 - g(|e_k^{DD}|)) \frac{|e_k^{CM}|}{|e_k^{DD}|},$$

$$g(x) = \frac{1}{1 + e^{-a(x-0.5)}}, a > 0$$

In Equation (15), $e_k^{CM}$, $e_k^{DD}$ are detected error values by applying Constant Modulus (CM) scheme and Decision Directed (DD) scheme to the received signal for an adaptive convergence of the received signal. The $e_k^{CM}$, $e_k^{DD}$ will be described herein below.

In the present invention, as indicated above, $e_k^{CM}$, $e_k^{DD}$ are detected by applying combination of the CM scheme and the DD scheme to the received signal for an adaptive convergence of the received signal. That is, when the $e_k^{DD}$ value is increased, a $g(|e_k^{DD}|)$ value is also increased. Consequently, an influence of the DD scheme is increased to a total error value.

In Equation (15), g(x) is an s shape-function (sigmoid function). Accordingly, in a region with a large influence of the CM scheme, an influence of the DD scheme is decreased. In contrast, in a region with a large influence of the DD scheme, an influence of the CM scheme is decreased.

In Equation (15), the error value $e_k$ is an error value by combining a value by applying a weight $\alpha^k$ to the $e_k^{CM}$ and a value by applying a weight $\beta^k$ to the $e_k^{DD}$. Herein, the weight $\alpha^k$ is a weight applied to the CM scheme as 'CM scheme application weight', and the weight $\beta^k$ is a weight applied to the DD scheme as 'DD scheme application weight'. Therefore, the error value $e_k$ is an error value detected by setting adaptively the weight $\alpha^k$ and the weight $\beta^k$ according to whether or not the error value of the received signal was converged.

Additionally, the characteristic of sigmoid function g(x) will be described herein below.

Figure 2:
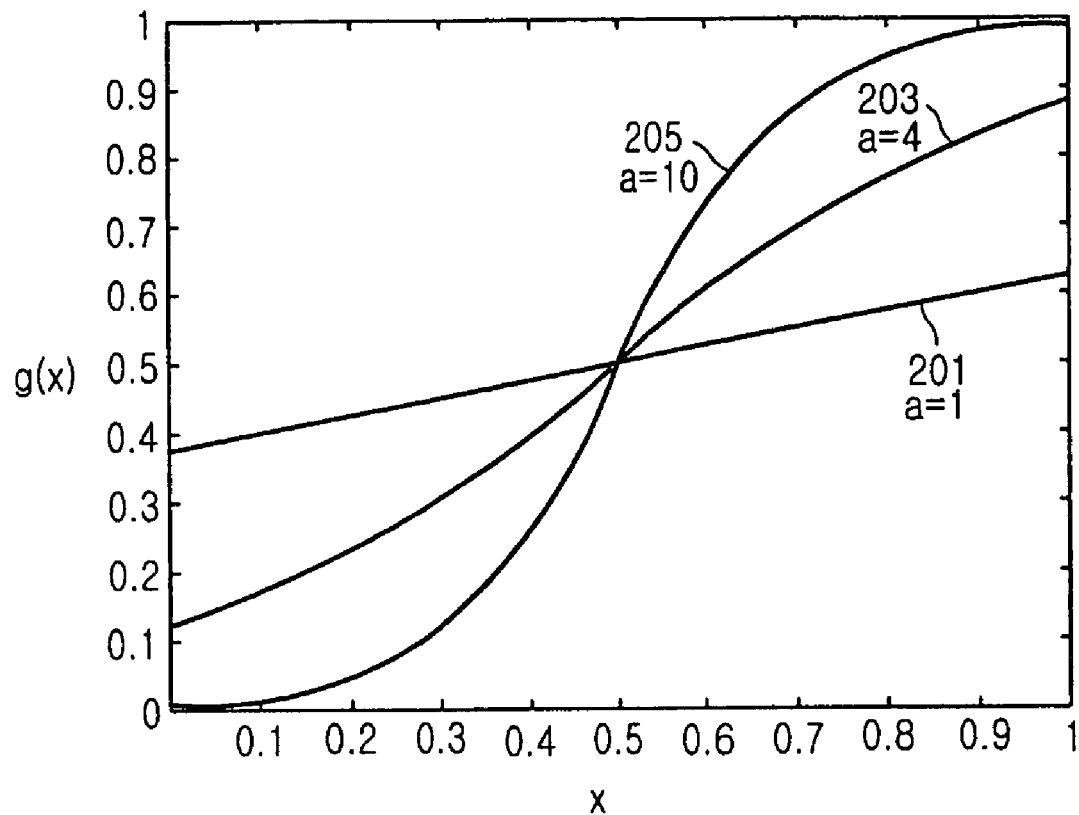
FIG. 2 is a graph illustrating a characteristic of sigmoid function used in an embodiment of the present invention.

The FIG. 2 is a graph illustrating the characteristic of sigmoid function used in an embodiment of the present invention. Referring to FIG. 2, the characteristic of sigmoid function is changed according to value 'a'. When the value a increases, a shape of sigmoid function is closed to an 's' shape. When the value a is equal to 1(a=1), the shape of sigmoid function is closed to a 'straight line' shape. That is, when the CM scheme application weight$\alpha^k$ is increased, the DD scheme application weight $\beta^k$ is decreased. However, when the CM scheme application weight$\alpha^k$ is decreased, the DD scheme application weight $\beta^k$ is increased.

If the error value $e_k$ calculated using the CM scheme is greater than the error value $e_k$ calculated using the DD scheme, the error value $e_k$ will be calculated by combining a weighted CM scheme and a more weighted DD scheme, compared with the weighted CM scheme.

Herein, the weighted CM scheme is used to apply the CM scheme application weight$\alpha^k$ to the CM scheme. The weighted DD scheme is used to apply the DD scheme application weight $\beta^k$ to the DD scheme. The "more weighted DD scheme as compared with the weighted CM scheme" refers to the DD scheme application weight $\beta^k$ being greater than the CM scheme application weight$\alpha^k$. In the same manner, the "more weighted CM scheme as compared with the weighted DD scheme refers" to the CM scheme application weight $\alpha^k$ being greater than the DD scheme application weight $\beta^k$.

Additionally, if the error value $e_k$ calculated by using the CM scheme is equal or smaller than the error value $e_k$ calculated by using the DD scheme, the error value $e_k$ will be calculated by combining a weighted DD scheme and a more weighted CM scheme, compared with the weighted DD scheme.

A constant modulus (CM) scheme, which is used for adaptive convergence of the received signal, is generally used in a blind equalizer and also used for a generation algorithm. When the CM scheme proposed by Godard is used, the cost function J is expressed as shown in Equation (16) below.

$$J_{Godard} = E[(|z_n|^p - R_p)^2] \quad (16)$$

In Equation (16), 'p' denotes a particular positive integer, and $R_p$ denotes a Godard modulus. The Godard modulus $R_p$ is defined as shown in Equation (17).

$$R_p = \frac{E[|z_n|^{2p}]}{E[|z_n|^p]} \quad (17)$$

Because the current OFDM mobile communication system generally uses a high-order modulation scheme, which is higher in order than quadrature phase shift keying (QPSK) modulation, the cost function J is separated into a real part and an imaginary part as shown in Equation (18). The cost function J is separated into a real part and an imaginary part because transmission/reception signals in the high-order modulation scheme have a real part and an imaginary part.

$$J = J_R + J_I \quad (18)$$
$$J_R = E[(z_{n,R}^2 - R_{2,R})^2], J_I = E[(z_{n,I}^2 - R_{2,I})^2]$$
$$R_{2,R} = \frac{E[z_{n,R}^4]}{E[z_{n,R}^2]}, R_{2,I} = \frac{E[z_{n,I}^4]}{E[z_{n,I}^2]}$$

It is assumed herein that the present invention uses the LMS scheme and the MMSE scheme, and p=2. Therefore, $d(k)=R_{2,R}+jR_{2,I}$. In addition, it is assumed that a cost function value J at an initial point, i.e., a k=0 point, is 0(J=0).

Figure 5:
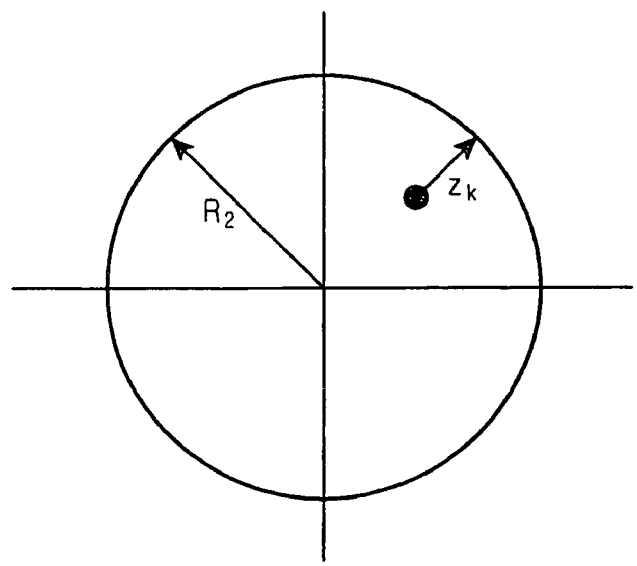
FIG. 5 is a diagram illustrating Constant Modulus (CM) schemes in an OFDM mobile communication system.

FIG. 5 is a diagram illustrating a CM scheme in an OFDM mobile communication system. Referring to FIG. 5, a CM scheme for p=2, $d(k)=R_{2,R}+jR_{2,I}$, and J=0 at a point with k=0. That is, if a value $R_2$ is determined by Equation (18), a circle is generated on a coordinate surface. Then, a received signal is determined as a point where an extension line drawn from the origin meets the circle. In FIG. 5, received $z_k$ is projected as a circle.

Above, the convergence step has been described. Herein below, a stabilizing step for acquiring the d(k) will be described.

If MSE is converged into a predetermined value through the convergence step, a change occurs from the convergence step to the stabilization step where calculation of Equation 19 is performed. A process where a change occurs from the convergence step to the stabilization step as the MSE is converged into a predetermined value will be described later on.

$$d_R(k)=Pr[Re(z(k))]$$
$$d_I(k)=Pr[Im(z(k))] \quad (19)$$

In the stabilization step, like in the convergence step, a real part and an imaginary part are separately calculated. In Equation (19), Pr denotes a received signal is projected as a signal most approximating the desired reception signal d(k) by a DD scheme. The DD scheme is a scheme for reflecting the d(k) as a decision value most approximating the received signal.

Figure 6:
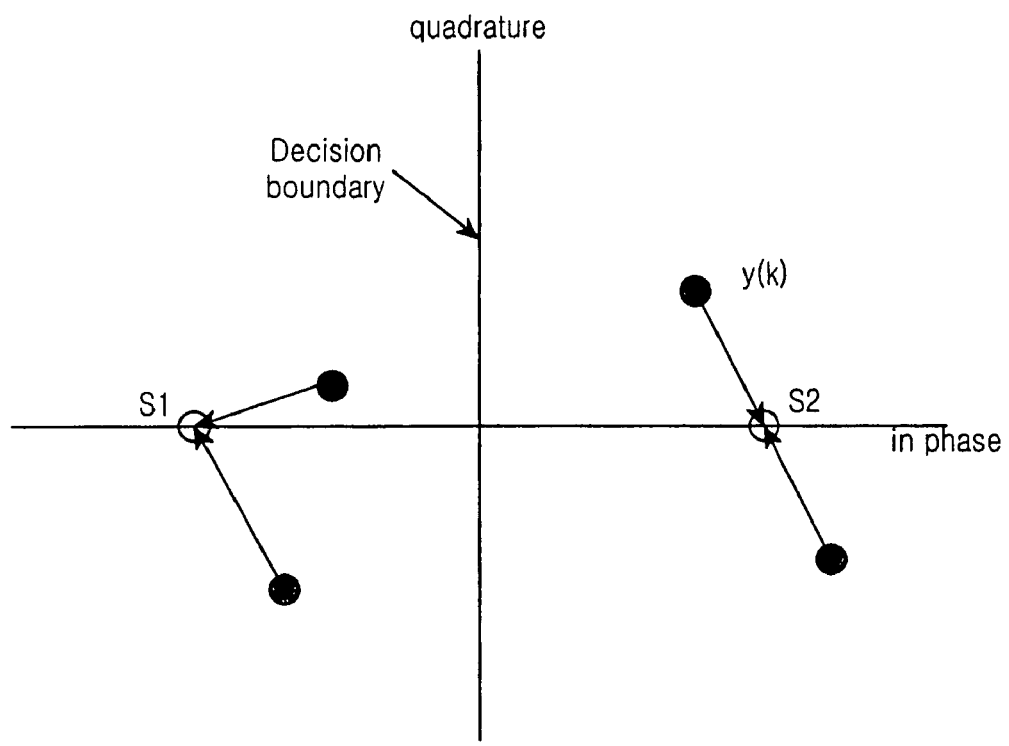
FIG. 6 is a diagram schematically illustrating Decision Directed (DD) schemes in an OFDM mobile communication system using Binary Phase Shift Keying (BPSK)

FIG. 6 is a diagram illustrating a DD scheme in an OFDM mobile communication system using Binary Phase Shift Keying (BPSK). Referring to FIG. 6, because it is assumed that the OFDM mobile communication system uses BPSK, if a reception signal is (1.2, −0.2) in an I-Q domain, the desired reception signal d(k) is projected as the largest approximate value of 1 after calculating a distance from +1 and −1.

Figure 3:
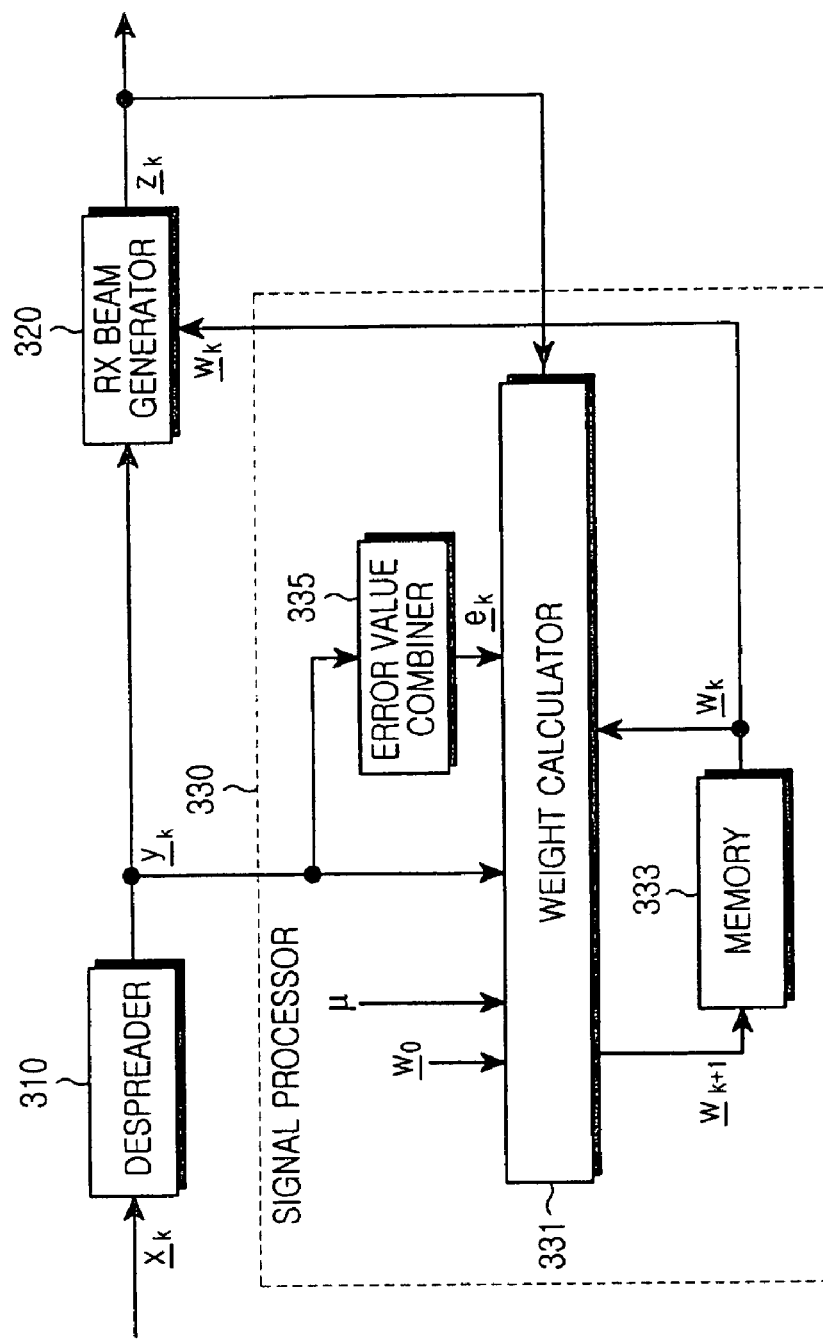
FIG. 3 is a block diagram illustrating a base station receiver according to an embodiment of the present invention.

FIG. 3 is a block diagram illustrating a BS receiver according to a first embodiment of the present invention. While describing FIG. 3, it should be noted that a BS receiver according to the first embodiment of the present invention is similar in structure to the BS receiver described in connection with FIG. 1, but different in a method for determining a reception beam weight by a signal processor. For simplicity, only the elements directly related to the present invention in the BS receiver will be described with reference to FIG. 3. Further, the first embodiment of the present invention corresponds to an embodiment where the LMS scheme is used.

Referring to FIG. 3, when a reception signal $x_k$ at a timing point k is received, a despreader 310 despreads the reception signal $x_k$ using a predetermined despreading code, and outputs the despread reception signal $y_k$ to a signal processor 330 and a reception beam generator 320. The signal processor 330 includes a weight calculator 331, a memory 333, and an error value combiner 335. For simplicity, FIG. 3 will be described with reference to only the first finger 140-1 in the BS receiver of FIG. 1. Therefore, the despreader 310 of FIG. 3 is substantially identical in operation to the N despreaders of the first despreader 141 to the $N^{th}$ despreader 143 in the first finger 140-1.

The error value combiner 335 inputs the despread reception signal $y_k$, and combines an error value $e^k$ by using the CM scheme and the DD scheme. The weight calculator 331 in the signal processor 330 calculates a reception beam weight $w_k$ by receiving the combined error value $e^k$, the despread reception signal $y_k$, a predetermined constant gain μ, and an initial reception beam weight $w_0$, and outputs the calculated reception beam weight to the memory 333. The memory 333 buffers the reception beam weight $w_k$ calculated by the weight calculator 331, and the weight calculator 331 uses the reception beam weight $w_k$ stored in the memory 333 when updating the reception beam weight $w_k$. That is, the weight calculator 331 updates a reception beam weight $w_{k+1}$ at the next timing point k+1 using the reception beam weight $w_k$ calculated at the timing point k.

Figure 4:
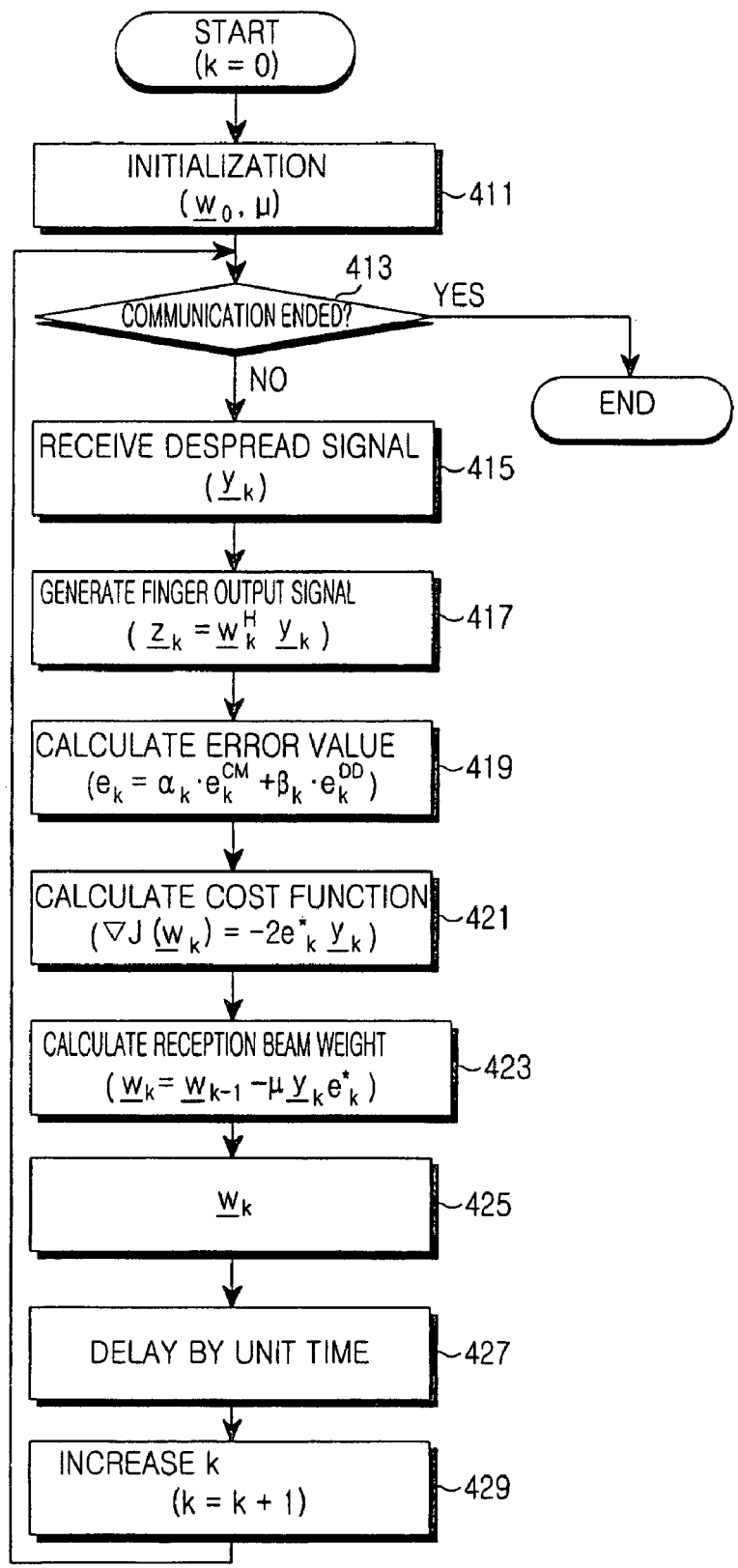
FIG. 4 is a flowchart illustrating a signal reception procedure by a base station receiver according to an embodiment of the present invention.

FIG. 4 is a flowchart illustrating a signal reception procedure by a BS receiver according to an embodiment of the present invention. Referring to FIG. 4, in step 411, a BS receiver establishes an initial reception beam weight $w_0$, and a constant gain μ. In step 413, the BS receiver determines if the communication has ended. If it is determined that the communication has ended, the BS receiver ends the ongoing procedure.

If it is determined in step 413 that the communication has not ended, the BS receiver proceeds to step 415. In step 415, the BS receiver receives a despread signal $y_k$ for the reception signal $x_k$. In step 417, the BS receiver calculates a set $z_k$ of signals $z_k$ output from respective fingers of the BS receiver using the despread signal $y_k$ and a reception beam weight $w_k$ ($z_k = w_k^H y_k$). The $z_k$ represents a set of finger output signals generated using a reception beam generated using the reception beam weight $w_k$.

In step 419, the BS receiver calculates an error value $e_k$ to decrease an error between the reception signal $x_k$ and a desired reception signal $$d_k(e_k = \alpha_k \cdot e_k^{CM} + \beta_k \cdot e_k^{DD}).$$

In step 421, the BS receiver calculates a differentiated value of a cost function using the despread signal $y_k$ and the error function $e_k(\nabla J(w_k) = -2e^*_k y_k)$. In step 423, the BS receiver calculates a reception beam coefficient, or a reception beam weight ($w_k = w_{k-1} - \mu y_k e^*_k$).

In step 425, the BS receiver maintains the calculated reception beam weight $w_k$. In step 427, the BS receiver delays by a predetermined unit time. The predetermined unit time is delayed in order to use a value determined at a $k^{th}$ snap for a $(k+1)^{th}$ snap, i.e., to take a state transition delay into consideration. In step 429, the BS receiver increases the k by 1, i.e., transitions from the current timing point k to the next timing point k+1, and then returns to step 413.

Figure 7:
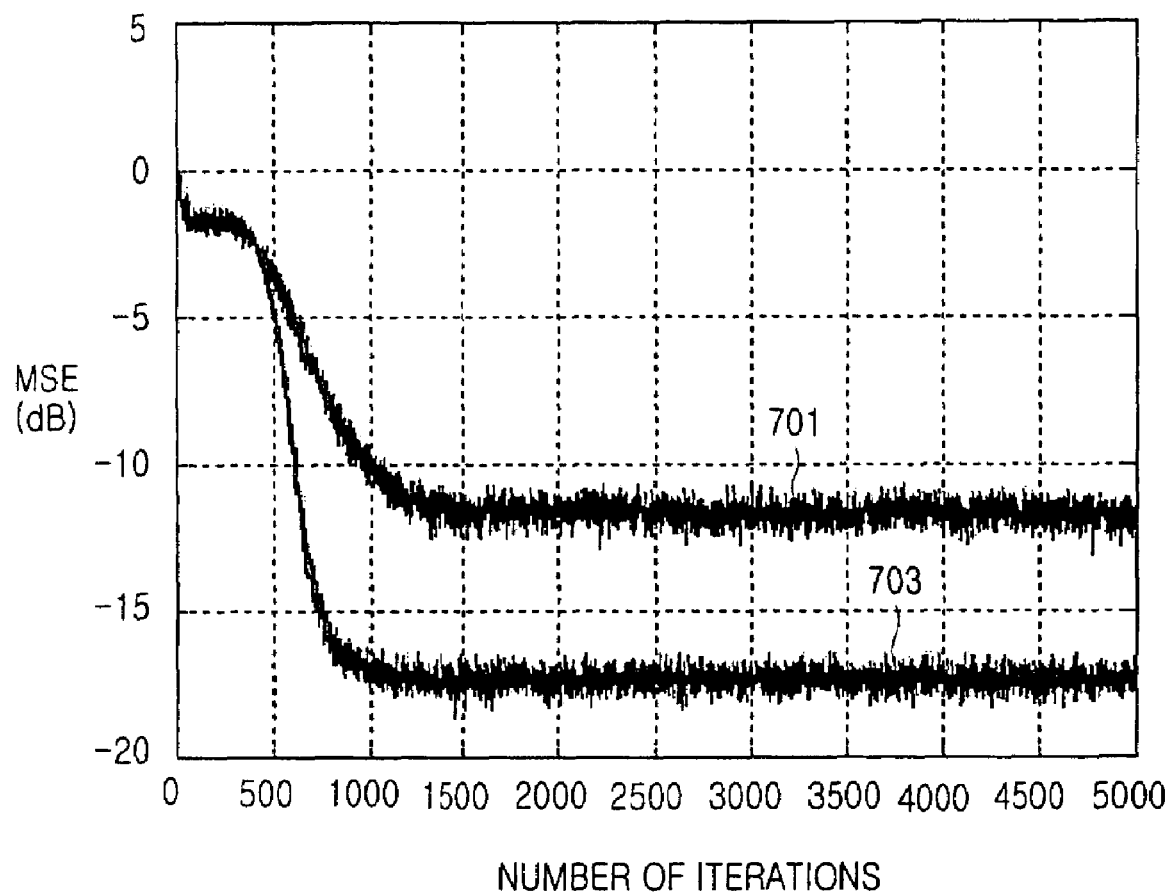
FIG. 7 is a graph illustrating a characteristic curve for a general reception beam weight generation schemes and a reception beam weight generation scheme according to an embodiment of the present invention.

FIG. 7 is a graph illustrating a characteristic curve for a general reception beam weight generation schemes and an reception beam weight generation scheme according to an embodiment of the present invention. Referring to FIG. 7, it is noted that an MSE value (y-axis) compared to a number of iterations (x-axis) for the reception beam weight generation scheme according to the present invention 703 is converged into a lower value, compared with an MSE value against the number of iterations for the conventional reception beam weight generation scheme 701, e.g., a CM scheme. That the MSE value is converged into a less value means that a reception beam can be correctly generated, making it possible to correctly receive only a desired reception signal.

Figure 8:
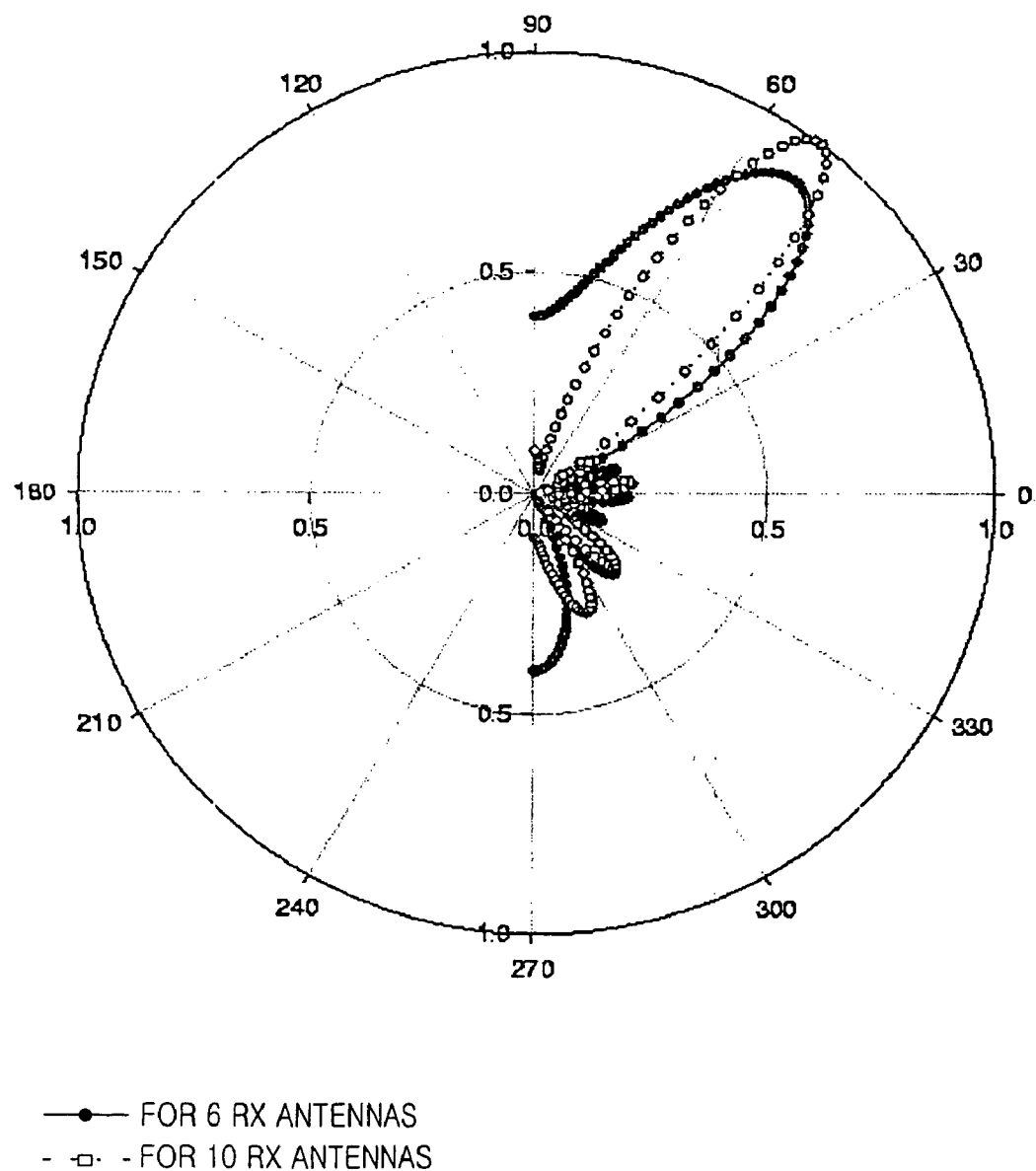
FIG. 8 is a graph illustrating a characteristic curve according to the number of reception antennas of a base station receiver for an reception beam weight generation scheme according to an embodiment of the present invention.

FIG. 8 is a graph illustrating a characteristic curve according to the number of reception antennas of a BS receiver for an adaptive reception beam weight generation scheme according to the embodiment of the present invention. Referring to FIG. 8, there is illustrated a radiation pattern for a BS receiver having 6 reception antennas and a BS receiver having 10 reception antennas. For example, if it is assumed that a particular BS is located at 57°, it is noted that compared with the BS receiver having 6 reception antennas, the BS receiver having 10 reception antennas has a normalized antenna gain of about 0.2, and can more correctly generate a reception beam. As a result, in terms of capacity of an OFDM mobile communication system, an increase in the number of the reception antennas causes an increase in the amplitude of the reception signals enabling a correct communication, thereby contributing to an increase in system capacity.

Figure 9:
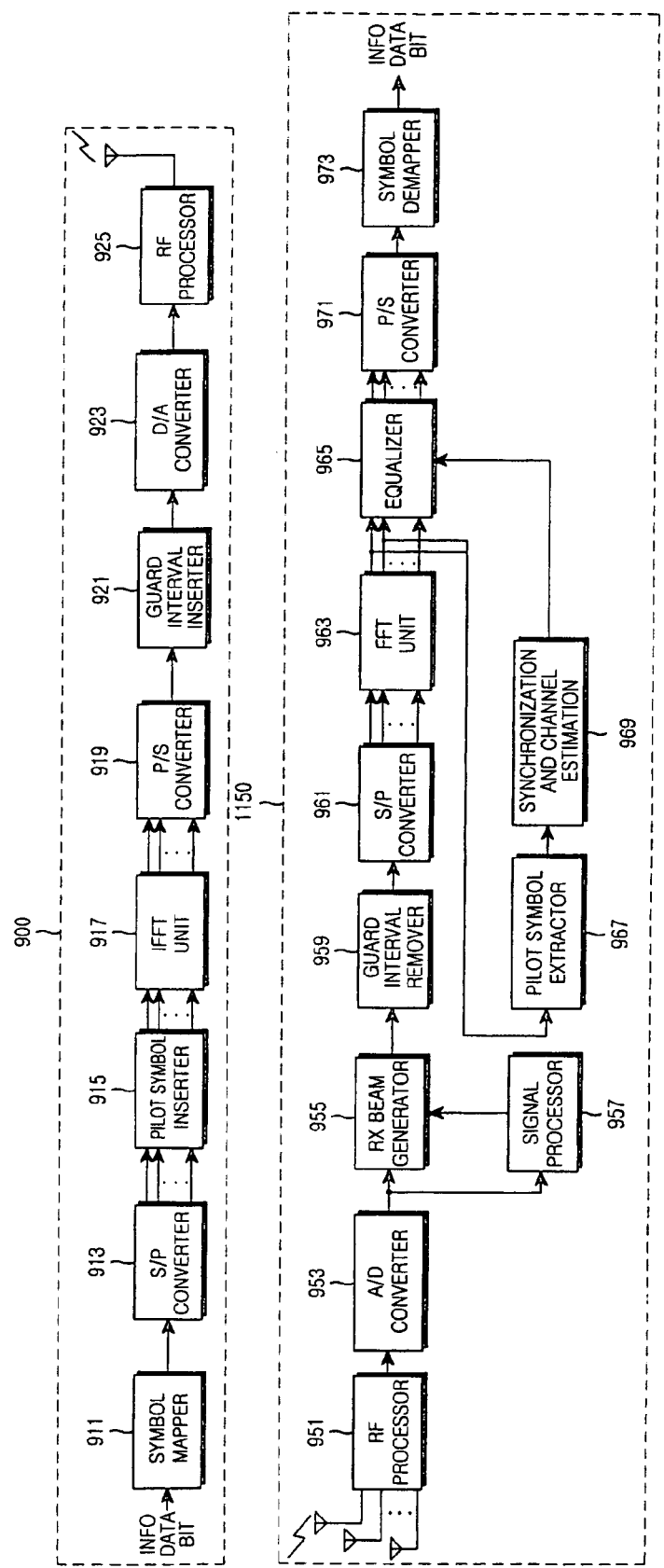
FIG. 9 is a block diagram illustrating a structure of an OFDM mobile communication system according to an embodiment of the present invention.

FIG. 9 is a block diagram illustrating a structure of an OFDM mobile communication system according to an embodiment of the present invention. Referring to FIG. 9, the OFDM communication system includes a transmitter, i.e., an MS transmitter 900, and a receiver, i.e., a BS receiver 950. The MS transmitter 900 includes a symbol mapper 911, a serial-to-parallel (or S/P) converter 913, a pilot pattern inserter 915, an inverse fast Fourier transform (IFFT) unit 917, a parallel-to-serial (or P/S) converter 919, a guard interval inserter 921, a digital-to-analog (D/A) converter 923, and a radio frequency (RF) processor 925.

When there are information data bits to be transmitted, the information data bits are input to the symbol mapper 911. The symbol mapper 911 modulates the input information data bits in a predetermined modulation scheme for symbol mapping, and outputs the symbol-mapped data bits to the serial-to-parallel converter 913. Here, quadrature phase shift keying (QPSK) or 16-ary quadrature amplitude modulation (16 QAM) can be used as the modulation scheme. The serial-to-parallel converter 913 parallel-converts serial modulation symbols output from the symbol mapper 911, and outputs the parallel-converted modulation symbols to the pilot pattern inserter 915. The pilot pattern inserter 915 inserts pilot patterns in the parallel-converted modulation symbols output from the serial-to-parallel converter 913, and then outputs the pilot pattern-inserted modulation symbols to the IFFT unit 917.

The IFFT unit 917 performs N-point IFFT on the signals output from the pilot pattern inserter 915, and outputs the resultant signals to the parallel-to-serial converter 919. The parallel-to-serial converter 919 serial-converts the signals output form the IFFT unit 917, and outputs the serial-converted signals to the guard interval inserter 921. The guard interval inserter 921 receives the signal output from the parallel-to-serial converter 919, inserts a guard interval therein, and outputs the guard interval-inserted signal to the digital-to-analog converter 923.

The guard interval is inserted to remove interference between a previous OFDM symbol transmitted at a previous OFDM symbol time and a current OFDM symbol to be transmitted at a current OFDM symbol time in an OFDM communication system. For the guard interval, a cyclic prefix method or a cyclic postfix method is used. In the cyclic prefix method, a predetermined number of last samples of an OFDM symbol in a time domain are copied and inserted into a valid OFDM symbol. In the cyclic postfix method, a predetermined number of first samples of an OFDM symbol in a time domain are copied and inserted into a valid OFDM symbol.

The digital-to-analog converter 923 analog-converts the signal output from the guard interval inserter 921, and outputs the analog-converted signal to the RF processor 925. The RF processor 925, including a filter and a front-end unit (not shown), RF-processes the signal output from the digital-to-analog converter 923 such that the signal can be transmitted via an antenna.

The BS receiver 950 includes an RF processor 951, an analog-to-digital (or A/D) converter 953, a reception beam generator 955, a signal processor 957, a guard interval remover 959, a serial-to-parallel (or S/P) converter 961, a fast Fourier transform (FFT) unit 963, an equalizer 965, a pilot symbol extractor 967, a synchronization & channel estimation unit 969, a parallel-to-serial (or P/S) converter 971, and a symbol demapper 973.

The signals transmitted by the MS transmitter 900 are received via reception antennas of the BS receiver 950. The received signals experience a multipath channel and have a noise component. The signals received via the reception antennas are input to the RF processor 951, which down-converts the signals received via the reception antennas into an intermediate frequency (IF) signal, and outputs the IF signal to the analog-to-digital converter 953. The analog-to-digital converter 953 digital-converts an analog signal output from the RF processor 951, and outputs the digital-converted signal to the reception beam generator 955 and the signal processor 957. Operations of the reception beam generator 955 and the signal processor 957 have been described above with reference to the first and second embodiments of the present invention. Therefore, a detailed description thereof will not be given again.

The signal output from the reception beam generator 955 is input to the guard interval remover 959. The guard interval remover 959 removes a guard interval from the signal output from the reception beam generator 955, and outputs the resultant signal to the serial-to-parallel converter 961. The serial-to-parallel converter 961 parallel-converts the serial signal output from the guard interval remover 959, and outputs the resultant signal to the FFT unit 963. The FFT unit 963 performs N-point FFT on the signal output from the serial-to-parallel converter 961, and outputs the resultant signal to the equalizer 965 and the pilot symbol extractor 967.

The equalizer 965 performs channel equalization on the signal output from the FFT unit 963, and outputs a resultant signal to the parallel-to-serial converter 971. The parallel-to-serial converter 971 serial-converts the parallel signal output from the equalizer 965, and outputs a resultant signal to the symbol demapper 973. The symbol demapper 973 demodulates the signal output from the parallel-to-serial converter 971 using a demodulation scheme corresponding to the modulation scheme used in the MS transmitter 900, and outputs a resultant signal as received information data bits.

The signal output from the FFT unit 963 is input to the pilot symbol extractor 967, and the pilot symbol extractor 967 extracts pilot symbols from the signal output from the FFT unit 963, and outputs the extracted pilot symbols to the synchronization & channel estimation unit 969. The synchronization & channel estimation unit 969 synchronizes and channel estimates the pilot symbols output from the pilot symbol extractor 967, and outputs the result to the equalizer 965.

As is understood from the foregoing description, the mobile communication system according to the present invention generates a weight using an adaptive reception beam weight generation scheme combined a CM scheme and a DD scheme, thereby making it possible to rapidly generate a reception beam weight with a minimum error value. Therefore, it is possible to generate a correct reception beam, and the correct reception of a reception beam enables a receiver to correctly receive only a desired signal, thereby improving system performance.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of generating a reception beam weight for generating a reception beam from a reception signal, the method comprising the steps of:
    determining a first error value by using a first scheme at a timing point, and a second error value by using a second scheme different from the first scheme at the timing point;
    determining a first scheme application weight and a second scheme application weight, each determined differently based on the first error value and the second error value;
    generating a third error value using a scheme that combines the first scheme to which the first scheme application weight is applied and the second scheme to which the second scheme application weight is applied; and
    determining by a weight calculator a reception beam weight using the reception signal, the third error value, and an output signal generated by applying the reception beam to the reception signal, wherein the reception beam weight is used for generating the reception beam, wherein the first scheme application weight and the second scheme application weight are determined using a sigmoid function.

2. The method of claim 1, wherein the first scheme is a Constant Modulus (CM) scheme and the second scheme is a Decision-Directed (DD) scheme.

3. The method of claim 1, wherein the second scheme application weight is determined as a value greater than the first scheme application weight, if the first error value is greater than the second error value.

4. The method of claim 1, wherein the first scheme application weight is determined as a value greater than the second scheme application weight, if the first error value is not greater than the second error value.

5. The method of claim 1, wherein each of the first and the second the error values is a value representative of a difference between a desired reception signal and the output signal.

6. The method of claim 5, wherein each of the first and the second the error values is a mean square error (MSE) value.

7. An apparatus of generating a reception beam weight for generating a reception beam from a reception signal, the apparatus comprising:
    an error value combiner for determining a first error value by using a first scheme at a timing point, and a second error value by using a second scheme different from the first scheme at the timing point, determining a first scheme application weight and a second scheme application weight, each determined differently based on the first error value and the second error value; generating a third error value using a scheme that combines the first scheme to which the first scheme application weight is applied and the second scheme to which the second scheme application weight is applied; and
    a weight calculator for determining a reception beam weight using the reception signal, the third error value, and an output signal generated by applying the reception beam to the reception signal, wherein the reception beam weight is used for generating the reception beam, wherein the error value combiner determines the first scheme application weight and the second scheme application weight using a sigmoid function.

8. The apparatus of claim 7, wherein the first scheme is a Constant Modulus (CM) scheme and the second scheme is a Decision-Directed (DD) scheme.

9. The apparatus of claim 7, wherein the error value combiner determines the second scheme application weight greater than the first scheme application weight, if the first error value is greater than the second error value.

10. The apparatus of claim 7, wherein the error value combiner determines the first scheme application weight greater than the second scheme application weight, if the first error value is not greater than the second error value.

11. The apparatus of claim 7, wherein each of the first and the second the error values is a value representative of a difference between a desired reception signal and the output signal.

12. The apparatus of claim 11, wherein each of the first and the second the error values is a mean square error (MSE) value.

* * * * *

UNITED STATES PATENT AND TRADEMARK OFFICE
CERTIFICATE OF CORRECTION

PATENT NO. : 7,586,981 B2  Page 1 of 1
APPLICATION NO. : 10/893439
DATED : September 8, 2009
INVENTOR(S) : Chae et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1451 days.

Signed and Sealed this

Twenty-first Day of September, 2010

David J. Kappos
*Director of the United States Patent and Trademark Office*